Figure 1:
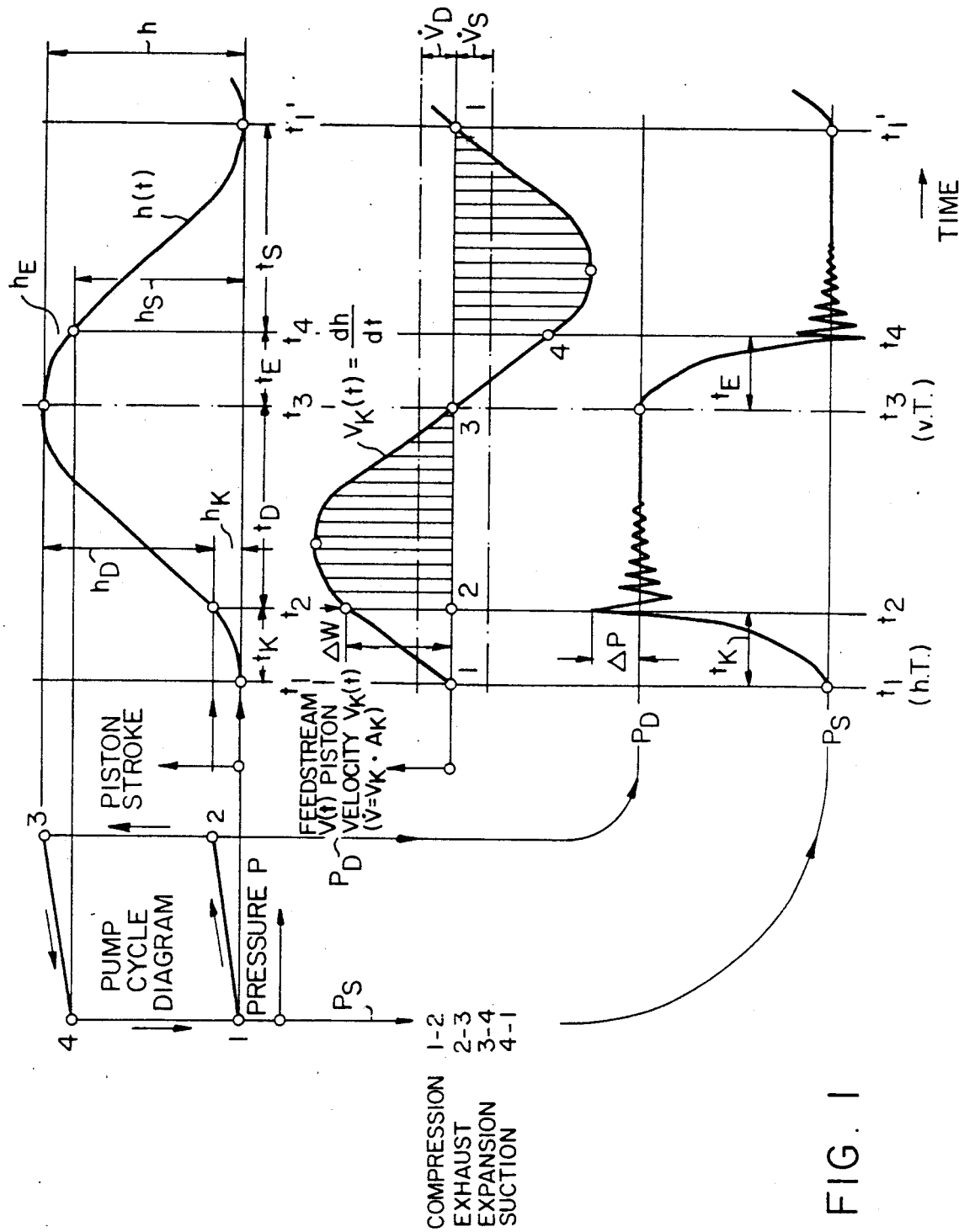

United States Patent [19]
Fritsch et al.

[11] Patent Number: 5,047,950
[45] Date of Patent: Sep. 10, 1991

[54] METHOD AND AN APPARATUS FOR MEASURING THE FLOW IN OSCILLATING DISPLACEMENT PUMPS

[75] Inventors: Horst Fritsch, Leonberg; Josef Benken, Weil der Stadt, both of Fed. Rep. of Germany

[73] Assignee: LEWA Herbert Ott GmbH & Co., Fed. Rep. of Germany

[21] Appl. No.: 343,073

[22] Filed: Jun. 2, 1989

Related U.S. Application Data

[63] Continuation of Ser. No. 203,289, Jun. 6, 1988, abandoned, which is a continuation of Ser. No. 946,965, Dec. 29, 1986, abandoned.

[30] Foreign Application Priority Data

Dec. 27, 1985 [DE] Fed. Rep. of Germany ......... 354618

[51] Int. Cl.$^5$ ............................................. G01L 23/00
[52] U.S. Cl. .................................................. 364/510
[58] Field of Search ............... 364/510, 509; 417/18, 417/19, 20, 43

[56] References Cited

U.S. PATENT DOCUMENTS

| | | | |
|---|---|---|---|
| 4,108,574 | 8/1978 | Bartley et al. | 417/19 |
| 4,624,625 | 11/1986 | Schrenker | 417/20 |
| 4,705,459 | 11/1987 | Buisine et al. | 417/53 |

Primary Examiner—Parshotam S. Lall
Assistant Examiner—S. A. Melnick
Attorney, Agent, or Firm—Bierman and Muserlian

[57] ABSTRACT

In a method and apparatus for measuring and monitoring the flow in oscillating displacement pumps, the basis for measurement used is the working principle of the pump itself and, accordingly, the mathematically unambiguous relation between the displacer kinematics and the compression or expansion time of the displacer is utilized, in particular via a microcomputer. For this purpose the compression time and expansion time are measured as the time difference between the back and the front dead point position of the plunger, respectively, and the coupling pressure peak at the beginning of the feeding process and the suction process, respectively, which is effected in particular by sensors.

7 Claims, 2 Drawing Sheets

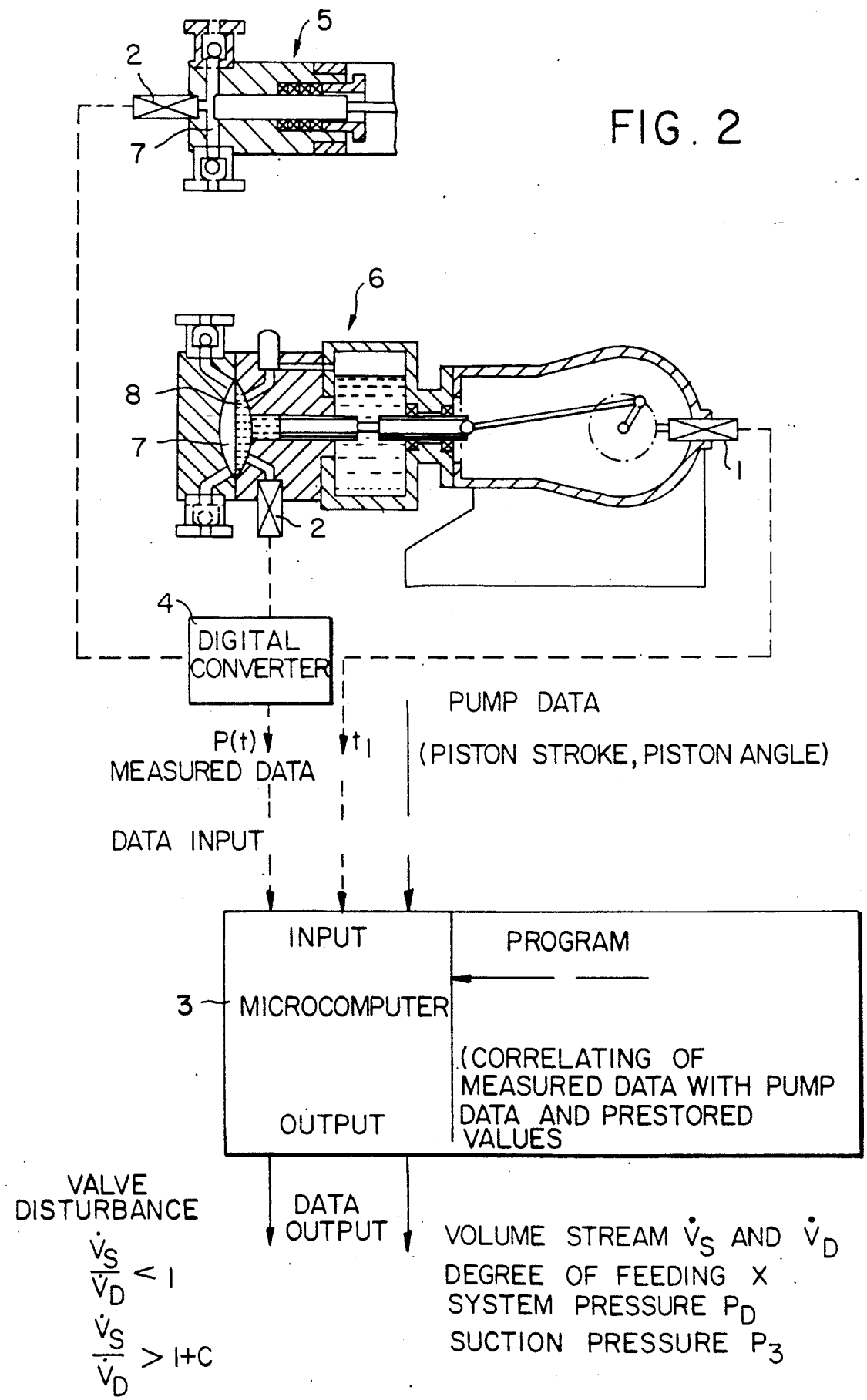

METHOD AND AN APPARATUS FOR MEASURING THE FLOW IN OSCILLATING DISPLACEMENT PUMPS

PRIOR APPLICATION

This application is a continuation of U.S. patent application Ser. No. 203,289 filed June 6, 1988 which is a continuation of U.S. patent application Ser. No. 946,965 filed Dec. 29, 1986 both now abandoned.

The present invention relates to a method for measuring and also monitoring the flow in ocillating displacement pumps, in particular d iphragm pumps, according to the introductory part of claim 1. The invention also relates to an apparatus for carrying out this method.

Oscillating displacement pumps, i.e. plunger pumps or diaphragm pumps, have pulsing action. Such pumps are usually used with small feed streams and high feed pressures.

It is problematic to measure such pulsating streams of liquid using conventional flow meters. This is due to the fact that mechanical and electrical inertia effects unacceptably falsify the measuring result in view of the typical feed characteristics of such a displacement pump.

Furthermore, additional problems arise due to certain properties of the liquid to be delivered, for example high viscosity, solid content, gas content, chemical aggressivity, etc.

The invention is therefore based on the problem of providing a method and an apparatus for measuring and monitoring the flow in oscillating displacement pumps which make it possible at any time, in spite of little constructional effort, to constantly measure and monitor the feed stream of the pump without any disturbance due to unacceptable influences.

The features of the invention provided to slove this problem can be found in the base claims. Advantageous embodiments thereof are described in the dependent claims.

The invention is based on the essential idea of using the working priniciple of the displacement pump itself for measuring and monitoring the flow.

The point of departure for this inventive idea is the well-known fact that every pump of this kind has a feed cycle consisting of a suction phase in which the liquid is sucked into a pump chamber, a compression phase in which the drawn in liquid is brought to the feed pressure, a feed phase in which part of the compressed liquid is expelled from the pump chamber and, finally, a decompression or expansion phase in which the liquid remaining in the pump chamber is again brought to the suction pressure.

To compress the feed liquid from the suction pressure to the feed pressure, every oscillationg displacement pump requires a certain small plunger path, compression path $h_K$, which is covered in compression time $t_K$.

An expansion path $h_E$ in expansion time $t_E$ is also required, to expand the feed liquid in the cylinder or pump chamber in the retracting phase of the plunger from the feed pressure to suction pressure. Since the plunger takes a relatively long time for very small paths at the reversal points, i.e. at the front dead point and the back dead point, this leads to easily measurable time intervals $t_K$ and $t_E$ even in the case of very small compression and expansion paths, which the invention makes use of successfully.

As set forth above, every oscillating displacement pump must first compress the drawn in liquid in the working area to the feed pressure before the head valve can open and the actual feeding process can begin. Thus, the plunger already has a speed greater than zero at the beginning of the feeding process. This means that when the head valve has opened the column of liquid in the pressure pipe is abruptly accelerated with a jump of speed $\Delta W$.

The same effect also occurs at the beginning of the suction process. In the retracting phase of the plunger, the liquid in the working area of the pump must first be expanded from the feed pressure to the suction pressure before the suction valve can open and the actual intake stroke can begin.

At this time the plunger again has a speed greater than zero. The column of liquid in the suction pipe is thus also abruptly accelerated with a jump of speed $\Delta W$.

According to the well-known law of Joukowsky, this results in a pressure surge $\Delta p$ with the value $$\Delta p = \rho \cdot a \Delta w \qquad (1)$$

$\rho$ = density of the feed liquid
$a$ = sonic speed in the feed liquid
$\Delta W$ = jump of speed relative to the cross-section of the pipe This physical effect is used according to the invention to determine the volume stream of the pump.

With the existing knowledge of the kinematic law of the pump, which is generally given by the number of revolutions and the driving gear kinematics and in which plunger travel h or feed stream V constitutes a special function dependent on time, an unambiguous relationship can therefore be established between the mean time value of feed stream $V_m$ and compression time $t_K$ or expansion time $t_E$ by simple mathematical relations.

According to the invention, the problem to be solved by measurement technology is thus reduced in a simple manner to that of determining compression time $t_K$ and/or expansion time $t_E$. The pressure pattern in time in the pump cylinder always has a pressure surge upwards, i.e. in the positive direction, when the head valve opens, while a pressure surge downwards, i.e. in the negative direction, occurs when the suction valve opens. Both pressure surges set oscillation processes going which, however, generally die away quickly due to attenuation and only have small amplitudes up to the end of the pressure stroke or intake stroke.

Compression time $t_K$ can be expressed as the difference between the time of positive pressure surge $t_2$ and back dead point $t_1$ of the plunger, i.e.

$$t_K = t_2 - t_1,$$

while expansion time $t_E$ can be expressed as the difference between the time of negative pressure surge $t_4$ and front dead point $t_3$ of the plunger, i.e.

$$t_E = t_4 - t_3.$$

According to the invention, above-mentioned dead point times $t_1$, $t_3$ can be simply measured by contactors or initiators on the rotating crankshaft of the pump driving gear. The time of positive or negative pressure surge $t_2$, $t_4$ can be registered by known pressure sensors.

Thus, the inventionn provides a method and an apparatus in which the flow in the pump is measured and monitored using the working principle of the pump itself as the basis for measurement and utilizing the mathematically unambiguous realtion between the displacer kinematics and the compression or expansion time of the displacer. This is preferably effected via a microcomputer. Compression time $t_K$ is measured as the time difference between the back or the front dead point position of the plunger and the coupling pressure peak at the beginning of the feeding process or the suction process, which may preferably be effected by means of sensors.

The invention shall be explained in more detail in the following with reference to the drawing, in which FIG. 1 is a schematic diagram of the curves of characteristic data during the pressure stroke and the intake stroke of a displacement pump, and FIG. 2 schematically shows the application of the invention to a diaphragm pump and to a plunger pump.

As can be clearly seen in the drawing, the inventive method and apparatus operate specifically in such a way that back dead point $t_1$ of the pump stroke is measured by a sensor 1, e.g. a proximity initiator or slot initiator, and the pressure in the pump cylinder is measured by a pressure sensor 2, e.g. a piezoelectric pressure sensor. At the first pump stroke starts the timing signal starts the internal timer of a microcomputer 3. The stroke frequency is ascertained by measuring running time $t'_1 - t_1$, and value $t_3$ is determined as follows by division:

$$t_3 - t_1 = \tfrac{1}{2}(t'_1 - t_1).$$

Pressure sensor 2 measures the pressure distribution in time p(t) in the pump cylinder. This analog signal is inputted to microcomputer 3 via an analog to digital converter 4.

The system pressure (=feed pressure) $p_D$ and suction pressure $p_S$ are stored in microcomputer 3, at the end of the pressure stroke at time $t_3$ and at the end of the intake stroke at time $t_1$, respectively.

Pressure surge time $t_2$ at the beginning of feeding is determined from the condition $p > p_D$, pressure surge time $t_4$ at the beginning of suction from the condition $p < p_S$.

Further input values which are stored in the constant value memory of microcomputer 3 are the pump-specific data such as the law of motion of the pump plunger and the diameter of the plunger.

A program fixes the linking conditions between the measuring signals and the pump-specific data. Microcomputer 3 then calculates at predetermined time intervals volume stream $V_D$ relative to system pressure $p_D$ and volume stream $V_S$ relative to suction pressure, as well as pump feeding degree X.

If the kinematic law of the pump plunger is a harmonic motion, i.e. runs according to a curve of sines, the following conditional equations result for the computing program for determining feeding degree X and volume streams $V_D$ and $V_S$:

$$X = \frac{1}{2}\left(1 + \cos \pi \frac{t_4 - t_3}{t_3 - t_1}\right)$$

$$V_S = \frac{A_K \cdot h}{4} \cdot \frac{1 + \cos \pi \frac{t_4 - t_3}{t_3 - t_1}}{t_3 - t_1}$$

-continued $$V_D = \frac{A_K \cdot h}{4} \cdot \frac{1 + \cos \pi \frac{t_2 - t_1}{t_3 - t_1}}{t_3 - t_1}$$

wherein $A_K$ = plunger surface area

Criteria which serve to signalize a disturbance in the case of deficient pump action are also inputted to the computing program.

Thus, in the case of $$\frac{V_S}{V_D} < 1$$

there is a valve disturbance, in the case of $$\frac{V_S}{V_D} > 1 + C(p_D - p_S)$$

there is a valve disturbance or gas pockets. Disturbances are indicated by an output signal at microcomputer 3.

Further output data which can be called in at a display, for example, are:
volume streams $V_S$ and $V_D$
feeding degree X
system pressure $p_D$
suction pressure $p_S$ The pressure distribution in the pump cylinder p(t) is inputted by pressure sensor 2 and time signal $t_1$ by sensor 1. The pump-specific data are inputted via the keyboard. With respect to the further elucidation of the invention, explicit reference is made to FIGS. 1 and 2 of the drawing, which is self-explanatory and clearly shows the invention itself and the manner in which it is used to measure and monitor the flow in oscillating displacement pumps. It can be applied, as apparent from FIG. 2, both to a diaphragm pump (lower part of FIG. 2) and to a plunger pump (upper part of FIG. 2). Pressure sensor 2, which measures the pressure in the pump cylinder, is disposed in the case of plunger pump 5 in feed chamber 7, but in the case of diaphragm pump 6 it is expediently disposed in hydraulic chamber 8 (=oil chamber). The latter is advantageous in that no problems of chemical resistance arise with respect to a possibly susceptible pressure sensor 2 since, being disposed in hydraulic chamber 8, it is always subjected to the same non-aggressive medium, usually oil, and is not subjected to a possibly aggressive feed medium located in feed chamber 7.

I claim:

1. An oscillating pump for pumping a fluid, said pump comprising a piston plunger disposed within a piston cylinder, said piston plunger being adapted to move within said piston cylinder between front and back dead points, said piston plunger being further adapted to act on a chamber whereby, in a forward stroke said piston feeds fluid from said chamber, fluid being drawn into said chamber by suction of a vacuum caused by a backstroke of said piston plunger, said oscillating pump further comprising;

pressure sensors for measuring a pressure response in said piston cylinder, means for determining a time $t_2$ at which a positive pressure surge associated with said suction occurs, and times at which said piston reaches said back dead point $t_1$, and said front dead point $t_3$, and means for calculating a volume flow of said pump based upon the determined times, using the kinematic equation of said piston.

2. The apparatus of claim 1 wherein said pump is a diaphragm pump.

3. An oscillating pump for pumping a fluid, said pump comprising a piston plunger disposed within a piston cylinder, said piston plunger being adapted to move within said piston cylinder between front and back dead points, said piston plunger being further adapted to act on a chamber whereby, in a forward stroke, said piston plunger feeds fluids form said chamber, fluid being drawn into said chamber by suction of a vacuum caused by a back stroke of said piston plunger, said oscillating pump further comprising;

pressure sensors for measuring a pressure response in said piston cylinder, means for determining at time $t_4$ at which a negative pressure surge associated with fluid feed occurs, and times at which said piston plunger reaches said front dead point $t_3$ and said back dead point $t_1$, and means for calculating a volume flow of said pump based on the determined times using the kinematic equation of the piston.

4. The apparatus of claim 3 wherein said pump is a diaphragm pump.

5. An oscillating pump for pumping a fluid, said pump comprising a piston disposed within a piston cylinder, said piston plunger being adapted to move within said piston cylinder between front and back dead points, said piston plunger being adapted to act on a chamber whereby, in a forward stroke, said piston feeds fluid from said chamber, fluid being drawn into said chamber by suction of a vaccum caused by a backstroke of said piston plunger, said oscillating pump further comprising;

means for sensing a positive pressure surge $\Delta P_S$ at the beginning of said suction, at a time $t_4$; means for determining the time at which said piston plunger reaches said back dead point $t_1$, means for sensing a negative pressure surge $\Delta P_D$ at the beginning of the fluid feed $t_2$ and a time at which said plunger reaches said front dead point $t_3$ and, means for calculating volume stream $V_D$ relative to system pressure $P_D$, volume stream $V_S$ relative to suction pressure $P_S$ and a degree of pump feeding X, based on the determined times, using the kinematic equation of the piston.

6. The oscillating pump of claim 5 wherein said piston plunger moves in harmonic motion and X, $V_D$, and $V_S$ can be calculated by the following formulae $$X = \frac{1}{2}\left(1 + \cos\pi\frac{t_4 - t_3}{t_3 - t_1}\right)$$

$$V_S = \frac{A_K \cdot h}{4} \cdot \frac{1 + \cos\pi\frac{t_4 - t_3}{t_3 - t_1}}{t_3 - t_1}$$

$$V_D = \frac{A_K \cdot h}{4} \cdot \frac{1 + \cos\pi\frac{t_2 - t_1}{t_3 - t_1}}{t_3 - t_1}$$

wherein $A_K$ is the area of the plunger surface and h equals the stroke height of said piston plunger.

7. The oscillating pump of claim 6 wherein said means for calculating is a microcomputer.

* * * * *